3,114,749
STEROIDAL PYRAZOLE-PYRIMIDINES
Pietro de Ruggieri and Carmelo Gandolfi, Milan, Italy, assignors to Ormonoterapia Richter S.p.A., a corporation of Italy
No Drawing. Filed Aug. 6, 1962, Ser. No. 215,243
Claims priority, application Italy Aug. 5, 1961
15 Claims. (Cl. 260—239.5)

The present invention relates to the compounds of the general formula

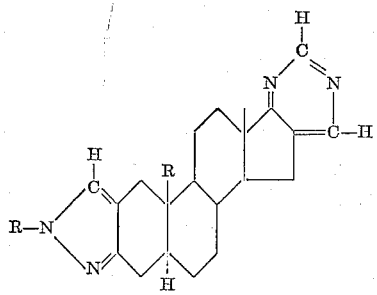

wherein R is a member selected from the group consisting of H and $CH_3$ and the related intermediate thereof.

These compounds are useful therapeutic agents in the field of endocrimology as antihormones, for atherosclerosis therapy and as antimitotic agents.

For the preparation of these compounds as starting materials, $5\alpha$ - androstane - $17\beta$ - ol - [3,2 - c] - pyrazole, $5\alpha$-estrane-$17\beta$-ol-[3,2-c]-pyrazole, and $5\alpha$-estrane-$17\beta$-ol-[3,2-c]-(1'-methyl)-pyrazole (R. O. Clinton and co-workers, J. Amer. Chem. Soc., 83, 1478, 1961), are oxidized to 17-keto derivatives and these reacted with ethyl formate and sodium methoxide or sodium hydride in order to obtain the 17-keto-16-hydroxy-methylene derivatives. The reaction with trisformyl-amino-methane in formamide afford the pyrazole-pyramidines in the title.

These compounds are also obtained starting with 16-hydroxy-methylene-$5\alpha$-androstane-$3\beta$-ol-17-one which, reacted with trisformylamino-methane, yield [17,16-d]-pyrimidine-$5\alpha$-androstane-$3\beta$-ol; this latter is oxidized to the 3-keto derivative which is reacted with ethyl formate and sodium methoxide or sodium hydride in order to obtain 2-hydroxy-methylene-$5\alpha$-androstane-3-one-[17,16-d]-pyrimidine.

The final reaction with hydrazine or methyl-hydrazine afford the compounds in the title.

The following examples are set forth as illustrating but not as limiting the invention.

EXAMPLE 1

$5\alpha$-Androstane-17-One-[3,2-c]-Pyrazole

To a solution of 0.5 part of $5\alpha$-androstane-$17\beta$-ol-[3,2-c]-pyrazole in 25 parts of N,N-dimethylformamide and 1 part of acetone were added at 5–10° C. over a period of 5 minutes 2 parts of a mixture of chromic anhydride and sulfuric acid in acetone solution, known as the Jones reagent and described by Bowden et al., J. Chem. Soc., 1946, page 39. The solution was then adjusted to pH 6 with sodium hydroxide, thoroughly diluted and filtered, to yield, after crystallization from acetone, 0.39 part of $5\alpha$-androstane-17-one-[3,2-c]-pyrazole; M.P. 248–250° C., $[\alpha]_D = +101°$ (chloroform).

EXAMPLE 2

$5\alpha$-Androstane-17-One-[3,2-c]-(1'-Methyl)-Pyrazole

To a solution of 0.75 parts of $5\alpha$-androstane-$17\beta$-ol-[3,2-c]-(1'-methyl)-pyrazole in 35 parts of N,N-dimethyl-formamide and 2 parts of acetone, were added 3.1 parts of Jones reagent at 5–10° C. over 5 minutes. The solution was then adjusted to pH 5.5 with 1 N sodium hydroxide, thoroughly diluted and filtered to yield, after crystallization from methanol, 0.51 part of $5\alpha$-androstane-17-one-[3,2-c]-(1'methyl)-pyrazole; M.P. 204–206° C.; $[\alpha]_D = +123°$ (chloroform).

EXAMPLE 3

$5\alpha$-Estrane-17-One-[3,2-c]-Pyrazole

To a solution of 3.2 parts of $5\alpha$-estrane-$17\beta$-ol-[3,2-c]-pyrazole in 125 parts of N,N-dimethyl-formamide and 10 parts of acetone, were added with stirring 7 parts of Jones reagent at 5–10° C. over 6 minutes. The solution was then adjusted to pH 6 with 1 N sodium hydroxide, thoroughly diluted and filtered to yield, after crystallization from acetone, 2.45 parts of $5\alpha$-estrane-17-one-[3,2-c]-pyrazole; M.P. 289–292° C.; $[\alpha]_D = +177°$ (chloroform).

EXAMPLE 4

$5\alpha$-Estrane-17-One-[3,2-c]-(1'-Methyl)-Pyrazole

To a solution of 1.2 parts of $5\alpha$-estrane-$17\beta$-ol-[3,2-c]-(1'-methyl)-pyrazole in 30 parts of N,N-dimethyl-formamide and 5 parts of acetone, were added with stirring 2.8 parts of Jones reagent at 5–10° C. over 5 minutes. The solution was then treated with alkali, thoroughly diluted with water and extracted with chloroform. After usual washing with 1 N sodium hydroxide and water, the organic fractions were evaporated to dryness to yield, through crystallization from acetone, 0.82 part of $5\alpha$-estrane-17-one-[3,2-c]-(1'-methyl)-pyrazole, M.P. 172–174° C.; $[\alpha]_D = +116°$ (chloroform).

EXAMPLE 5

16-Hydroxy-Methylene-$5\alpha$-Androstane-17-One-[3,2-c] Pyrazole

To a solution of 1 part of $5\alpha$-androstane-17-one-[3,2-c]-pyrazole in 60 parts of dry benzene, 0.8 part of sodium hydride were added. The reaction mixture was then maintained for 10 minutes under nitrogen atmosphere and 2 parts of ethyl formate were added. At the end of 8 hours the suspension was diluted with 40 parts of hexane and the resulting precipitate was filtered, dried under vacuum and dissolved in water. To the aqueous solution were then added 40 parts of 10% monobasic sodium phosphate solution and extracted with dichloromethane. The organic fraction was evaporated to dryness to yield, after crystallization from acetone, 0.68 parts of 16-hydroxy-methylene-$5\alpha$-androstane-17-one-[3,2-c]-pyrazole, M.P. 293–296° C.; $[\alpha]_D = +43$ (pyridine).

EXAMPLE 6

16-Hydroxy-Methylene-$5\alpha$-Estrane-17-One-[3,2-c]-Pyrazole

To a solution of 0.8 part of $5\alpha$-estrane-17-one-[3,2-c]-pyrazole in 40 parts of benzene, were added 0.6 part of sodium hydride. The reaction mixture was then maintained for 10 minutes under nitrogen atmosphere, 2 parts of ethyl formate were added and the mixture was stirred for 24 hours. The resulting suspension was diluted with 50 parts of hexane and the obtained precipitate was filtered, dried under vacuum and dissolved in water. After addition of 40 parts of 10% monobasic sodium phosphate, the aqueous solution was extracted with dichloromethane. The organic fraction was evaporated to dryness to yield, after crystallization from methanol 0.45 part of 16-hydroxy-methylene-$5\alpha$-estrane-17-one-[3,2-c]-pyrazole, M.P. 285° C.; $[\alpha]_D = +56°$ (pyridine).

EXAMPLE 7

16-Hydroxy-Methylene-$5\alpha$-Estrane-17-One-[3,2-c]-(1'-Methyl)-Pyrazole

To a solution of 1 part of $5\alpha$-estrane-17-one-[3,2-c]-

(1'-methyl)-pyrazole in 50 parts of dry benzene under nitrogen atmosphere, were added 1 part of sodium methoxide and, at the end of 10 minutes, 2 parts of ethyl formate. After stirring at room temperature for 12 hours, 50 parts of 15% monobasic sodium phosphate solution were added to the suspension. The so obtained organic fraction was first washed twice with 20 parts of 15% monobasic sodium phosphate solution and with water up to neutral pH, and then evaporated to dryness to yield, after crystallization from acetone, 0.48 part of 16-hydroxy-methylene-5α-estrane-17-one-[3,2-c] (1'-methyl)-pyrazole, M.P. 175–179° C.; $[\alpha]_D = +150°$ (chloroform).

EXAMPLE 8

*17,16-d-Pyrimidine-5α-Androstane-[3,2-c]-Pyrazole*

To 0.4 part of 16 hydroxy-methylene-5α-androstane-17-one-[3,2-c]-pyrazole dissolved into 20 parts of formamide, were added parts of trisformyl-amino-methane and 0.03 part of p-toluene-sulphonic acid. The solution was then heated for 7 hours at 160° C. under partial vacuum, and poured into 80 parts of 1 N sodium hydroxide. The resulting product was extracted with chloroform and washed with 1 N sodium hydroxide and with water up to neutral pH. After solvent exaporation and crystallization from acetone, 0.21 part of [17,16-d]-pyrimidine-5α-androstane-[3,2-c]-pyrazole were obtained, M.P. 323–326° C.; $[\alpha]_D = +80°$ (chloroform).

EXAMPLE 9

*[17,16-d]-Pyrimidine-5α-Androstane-[3,2-c]-(1'-Methyl)-Pyrazole*

0.2 part of 2-hydroxy-methylene-[17,16-d]-pyrimidine-5α-androstane-3-one in 5 parts of ethanol and a portion of 4% methyl-hydrazine in ethanol were refluxed for 1 hour. The solvent was evaporated under vacuum, and the residue was diluted with water and filtered to yield, after crystallization from methanol, 0.17 part of [17,16-d]-pyrimidine-5α-androstane-[3,2-c]-(1' - methyl) - pyrazole, M.P. 278–280° C.; $[\alpha] = +80°$ (pyridine).

EXAMPLE 10

*[17,16-c]-Pyrimidine-5α-Estrane-[3,2-c]-Pyrazole*

To a heated (160° C.) solution of 7 parts of 16-hydroxy-methylene-5α-estrane-17-one-[3,2 - c] - pyrazole in 150 parts of formamide, were added 10 parts of tris-formyl-amino-methane and 0.42 part of p-toluene-sulphonic acid. The reaction mixture was further heated for 7 hours under partial vacuum, poured into 1000 parts of 1 N sodium hydroxide and extracted with chloroform. The resulting organic fractions were then washed with 1 N sodium hydroxide and with water up to neutral pH, and dryed on calcium chloride. After solvent evaporation and crystallization from methanol, 2.7 parts of [17,16-c]-pyrimidine-5α-estrane-[3,2-c]-pyrazole were obtained, M.P. 285° C.; $[\alpha]_D = +140°$ C. (ethanol).

EXAMPLE 11

*[17,16-d]-Pyrimidine-5α-Estrane-[3,2-c]-(1'-Methyl)-Pyrazole*

To a solution of 0.5 part of 16-hydroxy-methylene-5α-estrane-17-one-[3,2-c]-(1'-methyl)-pyrazole in 20 parts of formamide were added 0.7 part of tris-formylamino-methane followed by 0.03 part of p-toluene-sulphonic acid. After heating under partial vacuum for 7 hours at 160° C., the solution was poured into 50 parts of 2 N sodium hydroxide, and the mixture was extracted with chloroform. After the organic fraction was washed with 1 N sodium hydroxide and water, the solvent was evaporated to dryness to give, through crystallization from acetone, 0.22 part of [17,16-d]-pyrimidine-5α-estrane-[3,2-c]-(1'-methyl)-pyrazole, M.P. 260–265° C.; $[\alpha]_D = +150°$ (chloroform); on the contrary a different crystal structure was obtained through crystallization from methanol; M.P. 285° C., $[\alpha]_D = +150°$ (chloroform).

EXAMPLE 12

*[17,16-d]-Pyrimidine-5α-Androstane-3β-ol*

To a solution of 7.5 parts of 16-hydroxy-methylene-5α-androstane-3β-ol-17-one in 150 parts of formamide at 165° C., were added 10.5 parts of tris-formyl-aminomethane followed by 0.45 parts of p-toluenesulphonic acid. The resulting solution was further heated for 7 hours under partial vacuum, and then poured into 700 parts of 1 N sodium hydroxide, and extracted with chloroform. After the organic fraction was washed with 1 N sodium hydroxide and with water up to neutral pH, the solvent was evaporated to give, after crystallization from acetone, 4.05 parts of [17,16-d]-pyrimidine-5α-androstane-3β-ol, M.P. 170–171° C.; $[\alpha]_D = +41°$ chloroform).

EXAMPLE 13

*[17,16-d]-Pyrimidine-5α-Androstane-3-One*

To a solution of 3 parts of [17,16-d]-pyrimidine-5α-androstane-3β-ol in 20 parts of N,N-dimethyl-formamide and 4 parts of acetone, were added with stirring 8 parts of Jones reagent at 5° C. over 6 minutes. After the excess chromic acid was destroyed with isopropyl alcohol, the reaction mixture was adjusted to pH 5 with 2 N sodium hydroxide, diluted with water and filtered to give, after crystallization from acetone, 2.4 parts of [17,16-d]-pyrimidine-5α-androstane-3-one, M.P. 211–213° C.; $[\alpha]_D = +57°$ (chloroform).

EXAMPLE 14

*2-Hydroxy-Methylene-[17,16-d]-Pyrimidine-5α-Androstane-3-One*

To 2.2 parts of [17,16-d]-pyramidine-5α-androstane-3-one in 60 parts of dry benzene, 1.2 parts of sodium hydride were added. The reaction mixture was then maintained for 10 minutes under nitrogen atmosphere and added with 4.6 parts ethyl formate. At the end of 8 hours the suspension was diluted with 50 parts of hexane. The resulting precipitate was filtered, dryed under vacuum and dissolved in water. The aqueous solution obtained was adjusted to pH 6.5–5 with saturated monobasic sodium phosphate solution, and extracted with dichloromethane. The organic fraction was evaporated to dryness to yield, after crystallization from methanol, 1.5 parts of 2 - hydroxy - methylene - [17,16 - d] - pyrimidine - 5α-androstane-3-one, M.P. 205–207° C.; $[\alpha]_D = +73°$ (chloroform).

We claim:

1. A compound of the formula

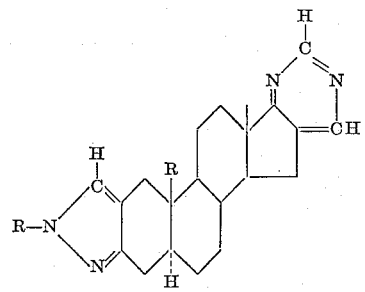

wherein R is a member selected from the group consisting of H and $CH_3$.

2. [3,2-c]-pyrazole-5α-androstane-17-one.
3. [3,2-c]-(1'-methyl)-pyrozole-5α-androstane-17-one.
4. [3,2-c]-pyrazole-5α-estrane-17-one.
5. [3,2-c]-(1'-methyl)-pyrazole-5α-estrane-17-one.
6. [3,2 - c] - pyrazole - 16 - hydroxy - methylene - 5α-androstane-17-one.
7. [3,2 - c] - pyrazole - 16 - hydroxy - methylene - 5α-estrane-17-one.

8. [3,2-c] - (1' - methyl) - pyrazole - 16 - hydroxy-methylene-5α-estrane-17-one.
9. [3,2 - c] - pyrazole - [17,16 - d] - pyrimidine - 5α-androstane.
10. [3,2 - c] - (1' - methyl) - pyrazole - [17,16 - d]-pyrimidine-5α-androstane.
11. [3,2-c]-pyrazole-[17,16-d]-pyrimidine-5α-estrane.
12. [3,2 - c] - (1' - methyl) - pyrazole - [17,16 - d]-pyrimidine-5α-estrane.
13. [17,16-d]-pyrimidine-5α-androstane-3β-ol.
14. [17,16-d]-pyrimidine-5α-androstane-3-one.
15. 2 - hydroxy - methylene - [17,16 - d] - pyrimidine-5α-androstane-3-one.

References Cited in the file of this patent

UNITED STATES PATENTS 2,945,852 Bergstrom _____ July 19, 1960
3,030,358 Manson _____ Apr. 17, 1962

OTHER REFERENCES

Clinton et al.: J.A.C.S. 83, pp. 1478–98 (1961).

Disclaimer 3,114,749.—*Pietro de Ruggieri* and *Carmelo Gandolfi*, Milan, Italy. STEROIDAL PYRAZOLE-PYRIMIDINES. Patent dated Dec. 17, 1963. Disclaimer filed Mar. 9, 1964, by the assignee, *Ormonoterapia Richter S.p.A.*
Hereby enters this disclaimer to claims 13 and 14 of said patent.
[*Official Gazette May 26, 1964.*]